July 2, 1929.  H. P. EASTMAN  1,719,361
METHOD OF FUMIGATING
Filed Oct. 22, 1924
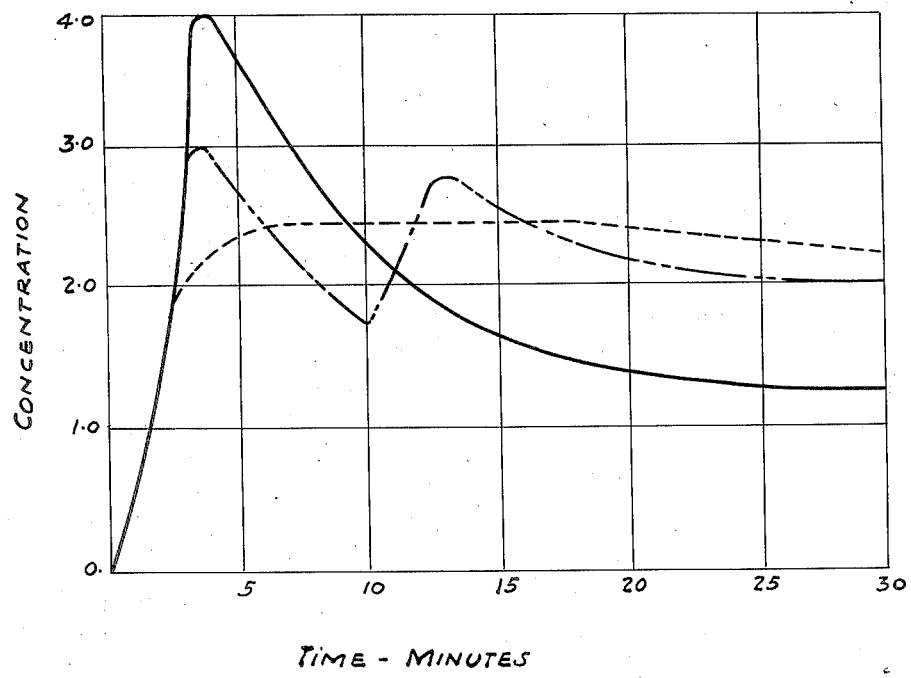
HAL· P. EASTMAN
INVENTOR.
BY
ATTORNEY Patented July 2, 1929.

1,719,361

UNITED STATES PATENT OFFICE.

HAL POND EASTMAN, OF AZUSA, CALIFORNIA, ASSIGNOR TO OWL FUMIGATING CORPORATION, OF NEW YORK, N. Y., A CORPORATION OF DELAWARE.

METHOD OF FUMIGATING.

Application filed October 22, 1924. Serial No. 745,172.

This invention relates to fumigation, more particularly to the fumigation of trees, shrubs and the like.

In the fumigation of plants, such as citrus trees, with hydrocyanic acid gas a canvas or other cover or tent is placed about the tree and liquid hydrocyanic acid is injected thereunder, the cover tending to confine the gasified hydrocyanic acid long enough to exterminate the insect life which infests the trees. The material used for covering the trees is not gas tight and, consequently, a leakage of poisonous gas takes place continuously throughout the fumigation period. The quantity of hydrocyanic acid used varies with climatic conditions, the size of the trees, and the kind and number of insects, and the correct quantity of fumigant to be used is determined empirically in each case.

Heretofore, the full dosage of the liquid fumigant was applied at one time with the result that the trees and the insects thereon were subjected, at the beginning of the fumigating period, to an abnormally high concentration of poisonous gas, which dropped off in a short time because of leakage to a nonlethal concentration. This procedure has not given uniformly satisfactory results. If the initial concentration was sufficiently high to kill substantially all the insects in a relatively short time, injury to the trees often resulted since the foliage is to some extent affected by the poisonous gas. If the concentration was not high enough to injure the trees, the percentage of insects killed was often not great enough to warrant the expense of the fumigation.

My invention is intended to overcome this difficulty, it being among the objects thereof to devise a method of fumigating which shall be effective to thoroughly fumigate and yet not cause injury to the plants being treated.

The effect of hydrocyanic acid gas on insects is cumulative, that is, exposure of insects thereto in low concentrations for a relatively long time is as effective as exposure to a high concentration for a short time. Therefore, the effectiveness of the fumigation is not a function of the maximum concentration thereof, but is dependent also on the time element, so that the effectiveness is measured by the product of the concentration and the time. I have determined that if I start with a relatively lower concentration of hydrocyanic acid gas than was previously used and maintain the said concentration more or less constant over the usual fumigation period, I obtain a better kill of insects with the use of approximately the same quantity of poisonous gas as heretofore. Although the additional kill is generally only a few per cent, say 5%–8%, it is of considerable importance as the additional kill represents a large part, as much as 75%–90%, of the insects remaining after the application of hydrocyanic acid by prior methods. Since it is this remainder which reproduces and brings forth the next crop of insects which must be later exterminated, it will be seen that my more efficient method eliminates, to a large extent, future infestation of the plants.

In practicing my invention I may utilize liquid hydrocyanic acid and introduce the same within the enclosure to be fumigated. Instead of introducing the entire calculated dose at once as was the practice hitherto, I introduce only a part thereof, say one-half. After a suitable time interval when the concentration has begun to drop materially, I inject the remainder of the dose either as a whole or in several successive portions.

I may utilize in place of liquid hydrocyanic acid which gasifies in the enclosure, a solid compound which is capable of liberating gaseous hydrocyanic acid under the conditions of the fumigation. Among such substances is a crude cyanide mixture, known as calcium cyanide, which contains the chlorides and cyanides of sodium and calcium and which reacts with the moisture of the air to liberate gaseous hydrocyanic acid. I have found that this substance, in more or less finely divided form, may be introduced under a tent or into any other enclosure and the reaction thereof with the moisture of the air in the space to be fumigated liberates gaseous hydrocyanic acid at such a rate that the concentration thereof is substantially constant over the entire fumigation period. In utilizing this substance I measure out an amount thereof which is calculated to give the desired dosage of poisonous gas, reduce the same to the fineness of a dust, and then blow or otherwise disseminate it throughout the space to be fumigated. The gradual liberation of hydrocyanic acid takes place substantially uniformly throughout the entire enclosure, minimizing the leakage and providing a fairly constant concentration of the fumigant with a resultant increase in the effectiveness thereof.

The accompanying drawing is a diagram showing the relative effectiveness of my new method of fumigation and of that of the prior art. The curves show the variation in concentration of fumigant throughout the period of fumigation.

Curve 1 is typical of the variations in concentration of poisonous gas which has been introduced in the liquid form into the enclosure in a single dose. After introduction the liquid rapidly vaporizes and the concentration increases to a maximum in about 4 minutes after which the decrease in concentration is almost as rapid, it falling to about two-thirds the maximum in another 5 minutes, the decrease then becoming more gradual so that in an additional 5 minutes the concentration has dropped to less than one-half and at the end of the fumigation period (30 minutes) to one-third of the maximum.

Curve 2 illustrates the practice of my invention wherein the liquid hydrocyanic acid is introduced in two portions, the first of which is about three-fourths of the total. The concentration of the gas builds up rapidly to a maximum in about 4 minutes after which it begins to fall reaching a minimum after about 10 minutes when the remainder of the dose is introduced. The concentration again rises to a maximum which is slightly less than the first and then falls at a rate similar to that of curve 1 until at the end of the fumigation period the concentration is about one-half the maximum, compared to one-third, as was the case in the method of the prior art. As a result the effectiveness of the fumigant is greatly increased.

In curve 3 I have illustrated the effect of fumigation in accordance with my invention with a solid material, such as calcium cyanide, capable of liberating gaseous hydrocyanic acid. After the introduction of the full dose of the solid material the concentration of the poisonous gas rapidly increases to a maximum in less than 5 minutes, and the concentration remains approximately constant over the entire fumigation period, the final concentration being but slightly less than the maximum.

As an example of the results which may be secured by my invention the following experiment is cited. I fumigated two lots of trees of ten each, the first by introducing the entire dose of hydrocyanic acid in one portion and the second by dividing the dose into two equal portions and introducing the second portion 15 minutes after the first. The trees were all of approximately the same size and required from 5 to 6 oz. of hydrocyanic acid per tree, as determined by the customary dosage schedule for orange trees in California. The average percentage of insects killed in the first lot was 92.3% and in the second lot 97.8%, an increase in the kill of 5.5%. The test was carried out under climatic conditions favorable to the production of injury to the tree, and although the expected injury was inflicted on the first lot of trees, it was not on the second lot.

Although I have described my invention setting forth certain details, I am not limited to the same since variations may be made therein within the scope of my invention. For instance, I may introduce the liquid fumigant in two or more than two portions and the amount of fumigant in each portion may be made any desired proportion of the whole. The amount of liquid fumigant to be used may be varied at will; if a higher kill is desired the amount should be approximately that heretofore used, and if the same kill is sufficient, a smaller amount is used.

In the claims I have used the terms "liberating" and "liberate" to indicate the formation of gaseous hydrocyanic acid. I intend that these terms shall cover not only the liberation thereof by chemical reaction, as is the case when a cyanide is used, but also the simple volitilization or atomization of the liquid into the gaseous form. When I speak of maintaining the concentration "substantially constant" I include variations in concentration within limits, such that the concentration is sufficiently constant to give improved results, as is indicated by curves 2 and 3 of the drawing.

What I claim is:

1. A method of fumigating which comprises introducing into an enclosed space a fumigant, a major portion of said fumigant being introduced initially and the lesser portion being introduced in such a manner that the concentration of said fumigant is substantially constant over a major portion of the fumigating period.

2. A method of fumigating which comprises providing an amount of a fumigant calculated to be sufficient to fumigate a predetermined space, introducing a major part of said fumigant in said space and when the concentration thereof begins to decrease introducing the remainder of said fumigant.

3. A method of fumigating which comprises providing an amount of a fumigant calculated to be sufficient to fumigate a predetermined space, introducing more than one half of said fumigant in said space and then introducing the remainder of said fumigant.

4. A method of fumigating which comprises providing an amount of a fumigant calculated to be sufficient to fumigate a predetermined space, introducing more than one half of said fumigant in said space and then introducing the remainder of said fumigant to provide a substantially uniform concentration during the fumigating period.

5. The process of treating trees with a volatile fumigant for pest control which consists of dividing a normal dose of the fumigant heretofore discharged under the tent in one volume into two unequal parts, applying the greater part of the dose which is adapted to maintain gas concentration above minimum insecticide efficiency for approximately one-half the period of exposure necessary for complete destruction of pests without such excessive initial concentration as to injure the trees, and applying the lesser part of the normal dose before the expiration of said first half of the period of exposure, said lesser part of the dose being adapted to reestablish approximately the original gas concentration so as to continue gas concentration in excess of minimum insecticide efficiency for the remainder of the period necessary for effective pest destruction.

In testimony whereof, I have hereunto subscribed my name this 30 day of September, 1924.

HAL POND EASTMAN.